(12) United States Patent
Tian et al.

(10) Patent No.: US 12,380,454 B2
(45) Date of Patent: *Aug. 5, 2025

(54) SYSTEM, METHOD, AND COMPUTER PROGRAM PRODUCT FOR GENERATING SYNTHETIC DATA

(71) Applicant: Visa International Service Association, San Francisco, CA (US)

(72) Inventors: Xiao Tian, Austin, TX (US); Jianhua Huang, Cedar Park, TX (US); Chiranjeet Chetia, Round Rock, TX (US); Shi Cao, Austin, TX (US); Marc Corbalan Vila, London (GB); Claudia Carolina Barcenas Cardenas, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/123,362

(22) Filed: Mar. 20, 2023

(65) Prior Publication Data

US 2023/0230089 A1    Jul. 20, 2023

Related U.S. Application Data

(63) Continuation of application No. 17/136,108, filed on Dec. 29, 2020, now Pat. No. 11,640,610.

(51) Int. Cl.
*G06Q 40/00* (2023.01)
*G06F 16/901* (2019.01)
(Continued)

(52) U.S. Cl.
CPC ..... *G06Q 20/4016* (2013.01); *G06F 16/9024* (2019.01); *G06N 20/00* (2019.01); *G06Q 20/4014* (2013.01)

(58) Field of Classification Search
CPC . G06Q 20/4016; G06N 20/00; G06F 16/9024
See application file for complete search history.

(56) References Cited

U.S. PATENT DOCUMENTS 10,671,672 B1 * 6/2020 Eksombatchai ........ G06F 18/23
2006/0123009 A1 * 6/2006 Bruno ................. G06F 16/217
(Continued)

FOREIGN PATENT DOCUMENTS

GB    2572760    * 10/2019 ............. G06Q 10/06
GB    2572760 A    10/2019
(Continued)

OTHER PUBLICATIONS

Lin et al., "Development of a Synthetic Data Set Generator for Building and Testing Information Discovery Systems," Third International Conference on Information Technology: New Generations (ITNG 06) 2006 (Year: 2006).*

(Continued)

*Primary Examiner* — Abhishek Vyas
*Assistant Examiner* — William B. Bunker
(74) *Attorney, Agent, or Firm* — The Webb Law Firm

(57) ABSTRACT

Provided are a method, system, and computer program product for generating synthetic data. The method includes generating a correlation graph of a plurality of data types based on a plurality of correlations. The method also includes generating a directed acyclic graph of the plurality of data types based on the correlation graph. The method further includes traversing the directed acyclic graph to produce a hierarchical graph of the plurality of data types, wherein the hierarchical graph includes a plurality of nodes, and wherein each node of the plurality of nodes is associated with a data type of the plurality of data types. The method further includes generating synthetic training data including a plurality of records of data by repeatedly traversing the (Continued)

hierarchical graph and based on a plurality of sets of values and a plurality of sets of interdependencies.

14 Claims, 14 Drawing Sheets

(51) Int. Cl.
*G06N 20/00* (2019.01)
*G06Q 20/40* (2012.01)

(56) References Cited

U.S. PATENT DOCUMENTS

| | | | |
|---|---|---|---|
| 2015/0012522 A1* | 1/2015 | Dey | G06F 16/21 |
| | | | 707/718 |
| 2016/0019271 A1 | 1/2016 | Ma et al. | |
| 2016/0162499 A1 | 6/2016 | Martinez Andrade et al. | |
| 2016/0196374 A1* | 7/2016 | Bar | G06F 21/577 |
| | | | 703/2 |
| 2021/0275918 A1 | 9/2021 | Devaranjan et al. | |
| 2021/0326652 A1* | 10/2021 | Hazard | G06N 5/045 |
| 2021/0397972 A1 | 12/2021 | Walters et al. | |
| 2022/0198471 A1 | 6/2022 | Silva et al. | |
| 2022/0215141 A1* | 7/2022 | Gutierrez | G06F 17/18 |

FOREIGN PATENT DOCUMENTS

| | | | | |
|---|---|---|---|---|
| WO | 2018194707 A1 | 10/2018 | | |
| WO | WO-2022008131 A1 * | 1/2022 | | G06N 20/20 |
| WO | WO-2022150343 A1 * | 7/2022 | | G06F 17/18 |

OTHER PUBLICATIONS

Ashraf Aboulnaga et al., "Generating Synthetic Complex-structured XML Data," University of Wisconsin—Madison, Computer Science Dept. 1999 (Year: 1999).*

Anonymous, Wikipedia—Graph Traversal, Nov. 2020 (Year: 2020).*

Houkjaer et al., "Simple and Realistic Data Generation," VLDB Endowment, Sep. 12-15, 2006, Seoul, Korea. (Year: 2006).*

Iannucci et al., "A Comparison of Graph-Based Synthetic Data Generators for Benchmarking Next-Generation Intrusion Detection Systems," IEEE International Conference on Cluster Computing, 2017 (Year: 2017).*

Zherdeva et al., "Prediction of human behavior with synthetic data," International Conference on Information Technology and Nonotechnology, 2021 (Year: 2021).*

Aboulnaga et al., "Generating Synthetic Complex-structured XML Data", Computer Sciences Dept., University of Wisconsin—Madison, 1999, 6 pages.

Assefa et al., "Generating synthetic data in finance: opportunities, challenges and pitfalls", 33rd Conference on Neural Information Processing Systems, 2019, pp. 1-10, NeurIPS Foundation, Vancouver, Canada.

Houkjaer et al., "Simple and Realistic Data Generation", Very Large Data Base Endowment, Sep. 12-15, 2006, pp. 1243-1246, Seoul, Korea.

Lin et al., "Development of a Synthetic Data Set Generator for Building and Testing Information Discovery Systems", Proceedings, Third International Conference on Information Technology: New Generations, 2006.

Yamanaka et al., "Financial Industry Use Cases for Graph Analytics", Oracle, May 2020, 66 pages.

* cited by examiner

SYSTEM, METHOD, AND COMPUTER PROGRAM PRODUCT FOR GENERATING SYNTHETIC DATA

CROSS-REFERENCE TO RELATED APPLICATION

This application is a continuation of U.S. patent application Ser. No. 17/136,108, filed Dec. 29, 2020, entitled "System, Method, and Computer Program Product for Generating Synthetic Data", the disclosure of which is hereby incorporated by reference in its entirety.

BACKGROUND

1. Field

This disclosure relates generally to data analysis techniques and applications and, in some non-limiting embodiments or aspects, to a system, method, and computer program product for generating a synthetic data.

2. Technical Considerations

Synthetic data (e.g., data that is not obtained by direct measurement of an environment) may be required for testing and training various computer-driven models. For synthetic data to be reliable as representative of an environment (e.g., a payment transaction processing network, a system of computer users, etc.), it is often required to generate the synthetic data using measured data (e.g., live data, historic data, etc.) of the environment as a reference/input. It may not be possible, from a time and/or a resource perspective, to obtain measured data to generate synthetic data.

There is a need in the art for a technical solution that may generate accurate synthetic data of an environment without needing to rely on measured data of the environment. There is a need for a technical solution including synthetic data generation that may be used for training machine learning models to work in an environment so that a computer-driven system may be implemented and made operational without waiting for measured data to be obtained.

SUMMARY

Accordingly, it is an object of the presently disclosed subject matter to provide systems, methods, and computer program products for generating synthetic data.

According to some non-limiting embodiments or aspects, provided is a computer-implemented method for generating synthetic data. The method may include receiving, with at least one processor, a plurality of data types associated with an environment to be evaluated. The method may also include receiving, with at least one processor, a plurality of correlations, each correlation of the plurality of correlations including a dependency of one data type of the plurality of data types on another data type of the plurality of data types. The method may further include generating, with at least one processor, a correlation graph of the plurality of data types based on the plurality of correlations. The method may further include generating, with at least one processor, a directed acyclic graph of the plurality of data types based on the correlation graph. The method may further include generating, with at least one processor, a hierarchical graph of the plurality of data types by applying a path traversal technique to the directed acyclic graph. The method may further include generating, with at least one processor, a synthetic dataset by repeatedly traversing the hierarchical graph to generate a plurality of records of data, each record of the plurality of records including values associated with the plurality of data types.

In some non-limiting embodiments or aspects, the environment to be evaluated may be a payment transaction processing network including a transaction processing system programmed and/or configured to process a plurality of transactions. The method may further include training, with at least one processor, at least one machine learning model of a fraud detection system using the synthetic dataset. The method may further include receiving, with at least one processor, an authorization request associated with a transaction between a merchant system and a payment device. The method may further include communicating, with at least one processor during payment processing of the transaction, at least a portion of the authorization request to the fraud detection system. The method may further include receiving, with at least one processor, a fraud evaluation of the transaction from the fraud detection system. The method may further include declining, with at least one processor, the authorization request based on the fraud evaluation. The plurality of data types may include at least two of the following: transaction time, payment device holder account identifier, transaction description, issuer identifier, acquirer identifier, transaction identifier, merchant account identifier, or any combination thereof.

In some non-limiting embodiments or aspects, the method may further include displaying or causing the display of, with at least one processor, the plurality of data types in a user interface. The method may further include receiving, with at least one processor, the plurality of correlations based on user input in the user interface identifying associations within the plurality of data types. The path traversal technique applied to the directed acyclic graph may include a random walk technique or a breadth first search technique.

According to some non-limiting embodiments or aspects, provided is a system for generating synthetic data. The system may include a server including at least one processor. The at least one processor may be programmed and/or configured to receive a plurality of data types associated with an environment to be evaluated. The at least one processor may be also programmed and/or configured to receive a plurality of correlations, each correlation of the plurality of correlations including a dependency of one data type of the plurality of data types on another data type of the plurality of data types. The at least one processor may be further programmed and/or configured to generate a correlation graph of the plurality of data types based on the plurality of correlations. The at least one processor may be further programmed and/or configured to generate a directed acyclic graph of the plurality of data types based on the correlation graph. The at least one processor may be further programmed and/or configured to generate a hierarchical graph of the plurality of data types by applying a path traversal technique to the directed acyclic graph. The at least one processor may be further programmed and/or configured to generate a synthetic dataset by repeatedly traversing the hierarchical graph to generate a plurality of records of data, each record of the plurality of records including values associated with the plurality of data types.

In some non-limiting embodiments or aspects, the environment to be evaluated may be a payment transaction processing network including a transaction processing system programmed and/or configured to process a plurality of transactions. The at least one processor may be further programmed and/or configured to train at least one machine learning model of a fraud detection system using the synthetic dataset. The at least one processor may be further programmed and/or configured to receive an authorization request associated with a transaction between a merchant system and a payment device. The at least one processor may be further programmed and/or configured to communicate, during payment processing of the transaction, at least a portion of the authorization request to the fraud detection system. The at least one processor may be further programmed and/or configured to receive a fraud evaluation of the transaction from the fraud detection system. The at least one processor may be further programmed and/or configured to decline the authorization request based on the fraud evaluation. The plurality of data types may include at least two of the following: transaction time, payment device holder account identifier, transaction description, issuer identifier, acquirer identifier, transaction identifier, merchant account identifier, or any combination thereof.

In some non-limiting embodiments or aspects, the at least one processor may be further programmed and/or configured to display or causing the display of the plurality of data types in a user interface. In some non-limiting embodiments or aspects, the at least one processor may be further programmed and/or configured to receive the plurality of correlations based on user input in the user interface identifying associations within the plurality of data types. The path traversal technique applied to the directed acyclic graph may include a random walk technique or a breadth first search technique.

According to some non-limiting embodiments or aspects, provided is a computer program product for generating synthetic data. The computer program product may include at least one non-transitory computer-readable medium including program instructions that, when executed by at least one processor, cause the at least one processor to receive a plurality of data types associated with an environment to be evaluated. The program instructions may further cause the at least one processor to receive a plurality of correlations, each correlation of the plurality of correlations including a dependency of one data type of the plurality of data types on another data type of the plurality of data types. The program instructions may further cause the at least one processor to generate a correlation graph of the plurality of data types based on the plurality of correlations. The program instructions may further cause the at least one processor to generate a directed acyclic graph of the plurality of data types based on the correlation graph. The program instructions may further cause the at least one processor to generate a hierarchical graph of the plurality of data types by applying a path traversal technique to the directed acyclic graph. The program instructions may further cause the at least one processor to generate a synthetic dataset by repeatedly traversing the hierarchical graph to generate a plurality of records of data, each record of the plurality of records including values associated with the plurality of data types.

In some non-limiting embodiments or aspects, the environment to be evaluated may be a payment transaction processing network including a transaction processing system programmed and/or configured to process a plurality of transactions. The plurality of data types may include at least two of the following: transaction time, payment device holder account identifier, transaction description, issuer identifier, acquirer identifier, transaction identifier, merchant account identifier, or any combination thereof. The program instructions may further cause the at least one processor to train at least one machine learning model of a fraud detection system using the synthetic dataset. The program instructions may further cause the at least one processor to receive an authorization request associated with a transaction between a merchant system and a payment device. The program instructions may further cause the at least one processor to communicate, during payment processing of the transaction, at least a portion of the authorization request to the fraud detection system. The program instructions may further cause the at least one processor to receive a fraud evaluation of the transaction from the fraud detection system. The program instructions may further cause the at least one processor to decline the authorization request based on the fraud evaluation.

In some non-limiting embodiments or aspects, the program instructions may further cause the at least one processor to display or cause the display of the plurality of data types in a user interface. The program instructions may further cause the at least one processor to receive the plurality of correlations based on user input in the user interface identifying associations within the plurality of data types. The path traversal technique applied to the directed acyclic graph may include a random walk technique or a breadth first search technique.

Further embodiments or aspects are set forth in the following numbered clauses:

Clause 1: A computer-implemented method comprising: receiving, with at least one processor, a plurality of data types associated with an environment to be evaluated; receiving, with at least one processor, a plurality of correlations, each correlation of the plurality of correlations comprising a dependency of one data type of the plurality of data types on another data type of the plurality of data types; generating, with at least one processor, a correlation graph of the plurality of data types based on the plurality of correlations; generating, with at least one processor, a directed acyclic graph of the plurality of data types based on the correlation graph; generating, with at least one processor, a hierarchical graph of the plurality of data types by applying a path traversal technique to the directed acyclic graph; and generating, with at least one processor, a synthetic dataset by repeatedly traversing the hierarchical graph to generate a plurality of records of data, each record of the plurality of records comprising values associated with the plurality of data types.

Clause 2: The computer-implemented method of clause 1, wherein the environment to be evaluated is a payment transaction processing network comprising a transaction processing system programmed and/or configured to process a plurality of transactions.

Clause 3: The computer-implemented method of clause 1 or clause 2, further comprising training, with at least one processor, at least one machine learning model of a fraud detection system using the synthetic dataset.

Clause 4: The computer-implemented method of any of clauses 1-3, further comprising: receiving, with at least one processor, an authorization request associated with a transaction between a merchant system and a payment device; communicating, with at least one processor during payment processing of the transaction, at least a portion of the authorization request to the fraud detection system; receiving, with at least one processor, a fraud evaluation of the transaction from the fraud detection system; and declining, with at least one processor, the authorization request based on the fraud evaluation.

Clause 5: The computer-implemented method of any of clauses 1-4, wherein the plurality of data types comprise at least two of the following: transaction time, payment device holder account identifier, transaction description, issuer identifier, acquirer identifier, transaction identifier, merchant account identifier, or any combination thereof.

Clause 6: The computer-implemented method of any of clauses 1-5, further comprising: displaying or causing the display of, with at least one processor, the plurality of data types in a user interface; and receiving, with at least one processor, the plurality of correlations based on user input in the user interface identifying associations within the plurality of data types.

Clause 7: The computer-implemented method of any of clauses 1-6, wherein the path traversal technique applied to the directed acyclic graph comprises a random walk technique or a breadth first search technique.

Clause 8: A system comprising a server including at least one processor, the at least one processor programmed and/or configured to: receive a plurality of data types associated with an environment to be evaluated; receive a plurality of correlations, each correlation of the plurality of correlations comprising a dependency of one data type of the plurality of data types on another data type of the plurality of data types; generate a correlation graph of the plurality of data types based on the plurality of correlations; generate a directed acyclic graph of the plurality of data types based on the correlation graph; generate a hierarchical graph of the plurality of data types by applying a path traversal technique to the directed acyclic graph; and generate a synthetic dataset by repeatedly traversing the hierarchical graph to generate a plurality of records of data, each record of the plurality of records comprising values associated with the plurality of data types.

Clause 9: The system of clause 8, wherein the environment to be evaluated is a payment transaction processing network comprising a transaction processing system programmed and/or configured to process a plurality of transactions.

Clause 10: The system of clause 8 or clause 9, wherein the at least one processor is further programmed and/or configured to train at least one machine learning model of a fraud detection system using the synthetic dataset.

Clause 11: The system of any of clauses 8-10, wherein the at least one processor is further programmed and/or configured to: receive an authorization request associated with a transaction between a merchant system and a payment device; communicate, during payment processing of the transaction, at least a portion of the authorization request to the fraud detection system; receive a fraud evaluation of the transaction from the fraud detection system; and decline the authorization request based on the fraud evaluation.

Clause 12: The system of any of clauses 8-11, wherein the plurality of data types comprise at least two of the following: transaction time, payment device holder account identifier, transaction description, issuer identifier, acquirer identifier, transaction identifier, merchant account identifier, or any combination thereof.

Clause 13: The system of any of clauses 8-12, wherein the at least one processor is further programmed and/or configured to: display or cause the display of the plurality of data types in a user interface; and receive the plurality of correlations based on user input in the user interface identifying associations within the plurality of data types.

Clause 14: The system of any of clauses 8-13, wherein the path traversal technique applied to the directed acyclic graph comprises a random walk technique or a breadth first search technique.

Clause 15: A computer program product comprising at least one non-transitory computer-readable medium including program instructions that, when executed by at least one processor, cause the at least one processor to: receive a plurality of data types associated with an environment to be evaluated; receive a plurality of correlations, each correlation of the plurality of correlations comprising a dependency of one data type of the plurality of data types on another data type of the plurality of data types; generate a correlation graph of the plurality of data types based on the plurality of correlations; generate a directed acyclic graph of the plurality of data types based on the correlation graph; generate a hierarchical graph of the plurality of data types by applying a path traversal technique to the directed acyclic graph; and generate a synthetic dataset by repeatedly traversing the hierarchical graph to generate a plurality of records of data, each record of the plurality of records comprising values associated with the plurality of data types.

Clause 16: The computer program product of clause 15, wherein the environment to be evaluated is a payment transaction processing network comprising a transaction processing system programmed and/or configured to process a plurality of transactions, and wherein the plurality of data types comprise at least two of the following: transaction time, payment device holder account identifier, transaction description, issuer identifier, acquirer identifier, transaction identifier, merchant account identifier, or any combination thereof.

Clause 17: The computer program product of clause 15 or clause 16, wherein the program instructions further cause the at least one processor to train at least one machine learning model of a fraud detection system using the synthetic dataset.

Clause 18: The computer program product of any of clauses 15-17, wherein the program instructions further cause the at least one processor to: receive an authorization request associated with a transaction between a merchant system and a payment device; communicate, during payment processing of the transaction, at least a portion of the authorization request to the fraud detection system; receive a fraud evaluation of the transaction from the fraud detection system; and decline the authorization request based on the fraud evaluation.

Clause 19: The computer program product of any of clauses 15-18, wherein the program instructions further cause the at least one processor to: display or cause the display of the plurality of data types in a user interface; and receive the plurality of correlations based on user input in the user interface identifying associations within the plurality of data types.

Clause 20: The computer program product of any of clauses 15-19, wherein the path traversal technique applied to the directed acyclic graph comprises a random walk technique or a breadth first search technique.

These and other features and characteristics of the present disclosure, as well as the methods of operation and functions of the related elements of structures and the combination of parts and economies of manufacture, will become more apparent upon consideration of the following description and the appended claims with reference to the accompanying drawings and appendix, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments or aspects that are illustrated in the accompanying schematic figures, in which.

DETAILED DESCRIPTION

Figure 1:
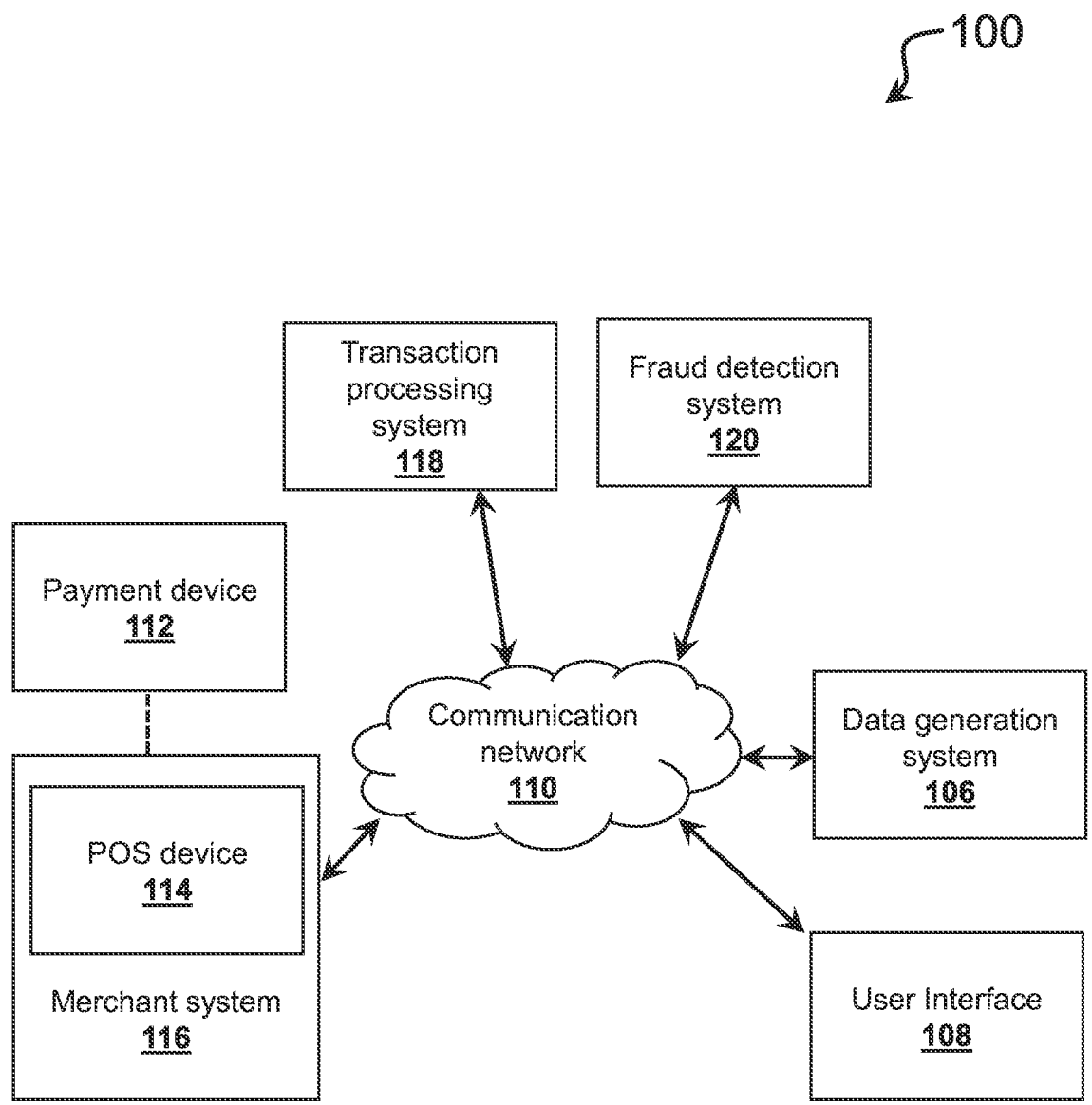
FIG. 1 is a diagram of a non-limiting embodiment or aspect of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "merchant" may refer to one or more entities (e.g., operators of retail businesses) that provide goods, services, and/or access to goods and/or services to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices which may be used by a merchant to initiate a transaction (e.g., a payment transaction), such as a transaction terminal. A POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like. As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction processing system" may refer to one or more computer systems operated by or on behalf of a transaction service provider, such as a transaction processing system executing one or more software applications. A transaction processing system may include one or more processors and, in some non-limiting embodiments or aspects, may be operated by or on behalf of a transaction service provider. The transaction processing system may process transactions in a payment transaction processing network, which may include one or more merchant systems, acquirer systems, issuer systems, payment gateways, and/or the like.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions that the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as point-of-sale (POS) devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/ or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

Non-limiting embodiments or aspects of the present disclosure are directed to methods, systems, and computer program products for generating synthetic data. Described systems and methods provide the technical improvement of reducing computer resources (e.g., uptime, number of communications, bandwidth, processing capacity, etc.) for operating a computer-networked environment. Described systems and methods remove the need for a run-up time to full operation of computer systems, which may otherwise have been required by first monitoring environment events, measuring data of users, and, thereafter, training/testing system components, generating usable synthetic data, and/or managing user interactions. Described systems and methods are also technically adaptable, as such synthetic data without reliance on measured data can allow for immediate system operation, while the synthetic data can be later modified when measured data is acquired, eliminating gaps between system setup and operation. Furthermore, because measured data is not necessary, described systems and methods provide a means for modeling future datasets through synthetic data generation.

Synthetic data may be used to train machine learning models, design user interfaces, assist end-to-end product development, and/or the like. Synthetic data not generated from measured data provides a further technical benefit of system security, as there is no need to gather personal information of real users in the environment. Moreover, synthetic data not generated from measured data accelerates the computer-driven development timeline, as it reduces the time required to train and/or test models, programs, and/or the like before going operational. For example, a fraud detection system of a payment transaction processing network can be made operational in a new environment earlier, before sufficient measured data may be obtained to otherwise generate synthetic data. By using machine learning models trained on synthetic data generated according to systems and methods described herein, fraudulent transactions may be detected earlier, compared to machine learning models trained on measured data. Earlier detection saves on computer time and resources required thereafter for remedial measures, such as if fraudulent transactions went undetected due to a lack of measured data.

Referring now to FIG. 1, illustrated is a schematic diagram of an environment 100 according to non-limiting embodiments or aspects of the present disclosure. The environment 100 may include a data generation system 106, which may be associated with a transaction service provider. The environment 100 may include a transaction processing system 118. The transaction processing system 118 and the data generation system 106 may be associated with a same transaction service provider. The data generation system 106 may be programmed and/or configured to generate a synthetic dataset according to methods described herein. For example, the data generation system 106 may receive a plurality of data types, receive a plurality of correlations among the plurality of data types, generate a correlation graph therefrom, generated a directed acyclic graph therefrom, generate a hierarchical graph therefrom, and generate a synthetic dataset by repeatedly traversing the hierarchical graph. The data generation system 106 may train and/or test one or more machine learning models of one or more systems using the generated synthetic dataset. The environment 100 may include a user interface 108 that may be used to display the plurality of data types and receive user input of one or more correlations.

The environment 100 may include a payment device 112 associated with a holder of the payment device 112. The payment device 112 may be used to engage in a transaction for payment from the holder of the payment device 112 to a merchant. The environment may include a point-of-sale (POS) device 114 of a merchant system 116 of a merchant. The payment device 112 may be provided and/or communicate with the POS device 114 of the merchant system 116 for facilitation of the transaction. The environment 100 may include a transaction processing system 118. The merchant system 116 may communicate an authorization request for a transaction, such as through an acquirer system and/or payment gateway, to the transaction processing system 118 for processing the transaction. The environment 100 may include a fraud detection system 120. The fraud detection system 120 may be programmed and/or configured to communicate with the transaction processing system 118 to receive at least a portion of an authorization request and generate a fraud evaluation based on at least a portion of the authorization request. One or more machine learning models of the fraud detection system 120 may be trained and/or tested with synthetic data generated by the data generation system 106. The transaction processing system 118, fraud detection system 120, and/or data generation system 106 may be included in a same system.

The environment 100 may include a communication network 110 by which one or more devices and/or systems of the environment 100 may communicate. A payment transaction processing network may comprise part or all of the communication network 110. The communication network 110 may include one or more channels for communication between subset combinations of one or more merchant systems 116, transaction processing systems 118, fraud detection systems 120, data generation systems 106, user interfaces 108, and/or the like.

Figure 2:
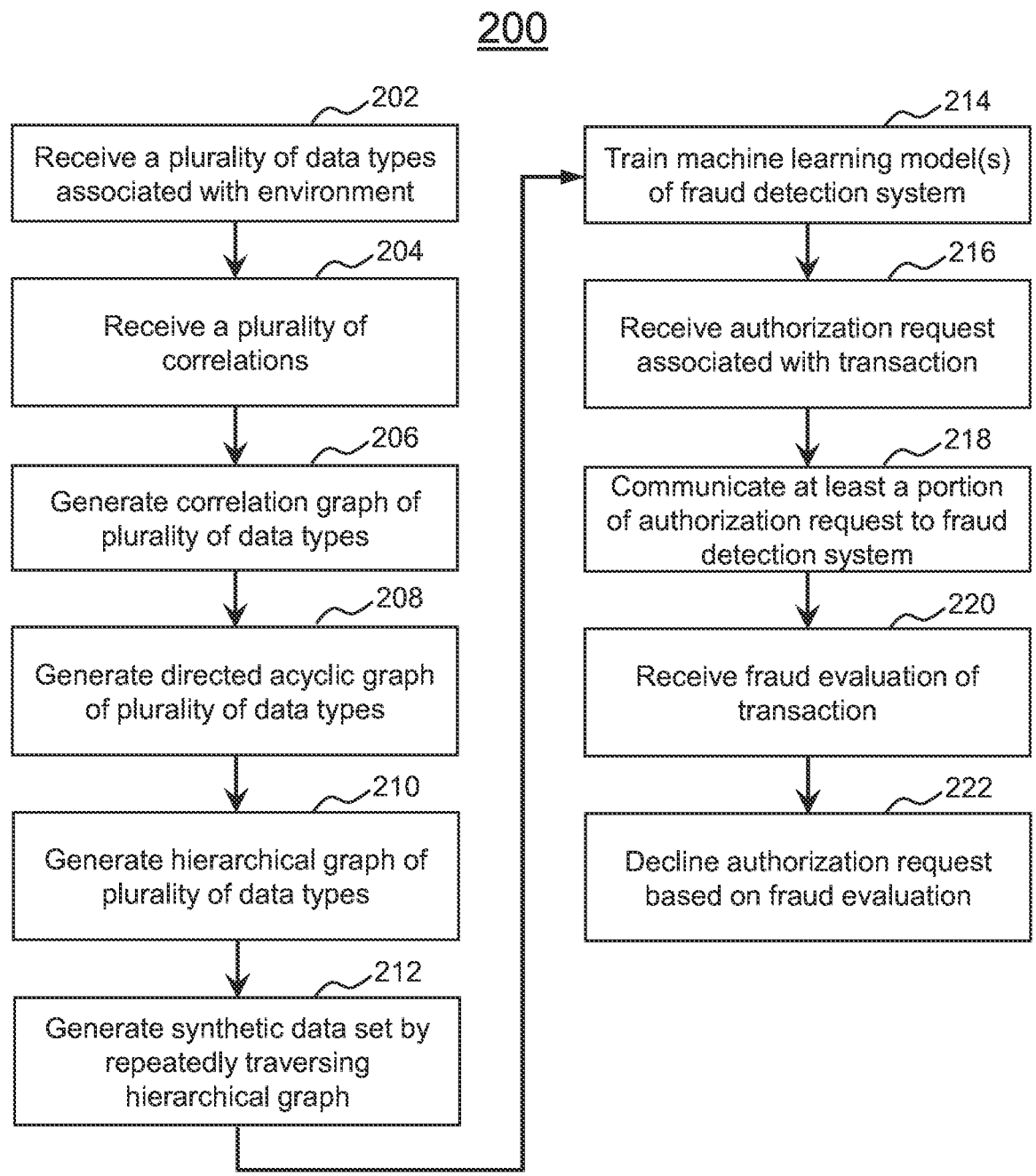
FIG. 2 is a flowchart illustrating a non-limiting embodiment or aspect of a method for generating synthetic data according to the principles of the present disclosure.

Referring now to FIG. 2, illustrated is a method 200 for generating synthetic data. The method 200 may be executed by one or more computing devices of a POS device 114, a merchant system 116, a transaction processing system 118, a fraud detection system 120, a data generation system 106, a user interface 108, a communication network 110, and/or the like. One or more steps of the method 200 may be performed by a same or different computing device than a preceding or following step of the method 200.

In step 202, a plurality of data types may be received. For example, a data generation system 106 may receive a plurality of data types associated with an environment to be evaluated. In some non-limiting embodiments or aspects, the environment to be evaluated may be a payment transaction processing network. The payment transaction processing network may include a transaction processing system 118 that is programmed and/or configured to process a plurality of transactions. For example, the plurality of data types may be associated with transaction data and may include, but are not limited to, transaction identifier (e.g., a unique identifier of the transaction), debit amount (e.g., an amount to be deducted from a payment device account associated with the transaction), credit amount (e.g., an amount to be added to a merchant account associated with the transaction), transaction description, payment device holder account identifier (e.g., an identifier associated with an account of a payment device holder managed by an issuer, the account associated with a payment device used in a transaction), payment device holder identifier (e.g., an identifier associated with a holder of the payment device of a transaction), payment device holder name, merchant account identifier (e.g., an identifier of an account of a merchant managed by an acquirer, the account associated with a merchant system involved in a transaction), merchant identifier (e.g., an identifier associated with a merchant involved in a transaction), merchant name, issuer identifier (e.g., an identifier of an issuer associated with an account of a payment device involved in a transaction), acquirer identifier (e.g., an identifier of an acquirer associated with an account of a merchant associated in a transaction), transaction time, transaction trace number (e.g., a unique number assigned by an acquirer system that identifies the transaction), standard entry class code (SEC code) (e.g., an identifier of a specific payment application indicative of account/market type, transaction type, credit/data transaction methods, etc.), and/or the like. It will be appreciated that the plurality of data types may be tailored to the environment to be evaluated.

In step 204, a plurality of correlations may be received. For example, the data generation system 106 may receive a plurality of correlations, wherein each correlation of the plurality of correlations includes a dependency of one data type on another data type. For example, in an environment that includes a payment transaction processing network, the plurality of data types may be associated with transaction data, and a merchant identifier may be correlated with a merchant name. By way of further example, a transaction time may be correlated with a trace number, and a payment device holder name may be correlated with an issuer identifier. The plurality of correlations may be computer-generated. Additionally or alternatively, the plurality of correlations may be input by a user.

In step 206, a correlation graph may be generated. For example, the data generation system 106 may generate a correlation graph of the plurality of data types based on the plurality of correlations. The correlation graph may include a plurality of nodes, each node associated with a data type of the plurality of data types. The correlation graph may further include a plurality of edges, each edge associated with a correlation between two data types. For an example of a correlation graph generated from a plurality of data types, see FIG. 6.

In step 208, a directed acyclic graph (DAG) may be generated. For example, the data generation system 106 may generate a DAG of the plurality of data types based on the correlation graph. The DAG may include a plurality of nodes, each node associated with one or more data types, which may include one or more nodes of the correlation graph. The data generation system 106 may combine data types (nodes) of the correlation graph into a same node in the DAG to be processed together in a same step. The DAG may include a plurality of directed edges, each directed edge associated with a dependency of one node of the DAG on another node of the DAG. For example, a directed edge may be visually represented by a line with an arrow on one end, wherein a node proximal to the arrow end of the directed edge depends on the value of the node connected to the opposite end of the directed edge. Generation of the DAG greatly simplifies the correlation graph, thereby increasing saliency and decreasing processing time.

In step 210, a hierarchical graph may be generated. For example, the data generation system 106 may generate a hierarchical graph of the plurality of data types by applying a path traversal technique to the DAG. The path traversal technique may include a random walk technique. Additionally or alternatively, the path traversal technique may include a breadth first search technique. See FIGS. 8-13 for further description on generating a hierarchical graph by applying a path traversal technique to a DAG.

In step 212, a synthetic dataset may be generated. For example, the data generation system 106 may generate a synthetic dataset by repeatedly traversing the hierarchical graph to generate a plurality of records of data. Each record of the plurality of records may include values associated with the plurality of data types. See FIG. 14 for further description of generating values from the hierarchical graph.

In step 214, at least one machine learning model may be trained. For example, the data generation system 106 may train one or more machine learning models of a system in the environment 100. The synthetic dataset may be used as a training set to replace measured data that may be otherwise used for training said machine learning model(s). In some non-limiting embodiments or aspects, the machine learning model(s) to be trained may be included in a fraud detection system.

In step 216, an authorization request may be received. For example, a transaction processing system 118 may receive an authorization request associated with a transaction between a merchant system 116 and a payment device 112. The authorization request may include transaction data, including, but not limited to, a transaction identifier, a debit amount, a credit amount, a transaction description, a payment device holder account identifier, a payment device holder identifier, a payment device holder name, a merchant account identifier, a merchant identifier, a merchant name, an issuer identifier, an acquirer identifier, a transaction time, a transaction trace number, a SEC code, and/or the like.

In step 218, at least a portion of the authorization request may be communicated. For example, the transaction processing system 118 may communicate at least a portion of the authorization request (e.g., one or more portions of transaction data therein) to a fraud detection system 120. Additionally or alternatively, the transaction processing system 118 and the fraud detection system 120 may be a same system and/or comprised within a same system.

In step 220, a fraud evaluation may be received. For example, the transaction processing system 118 may receive, from the fraud detection system 120, a fraud evaluation of the transaction. The fraud detection system 120 may generate a fraud evaluation based at least partially on the at least a portion of the authorization request communicated to the fraud detection system 120.

In step 222, the authorization request may be declined. For example, the transaction processing system 118 may decline the authorization request based (e.g., at least partly) on the fraud evaluation received from the fraud detection system 120. In some non-limiting embodiments or aspects, the fraud evaluation may comprise a categorization or value associated with a likelihood of the transaction associated with the authorization request being a fraudulent transaction. The transaction processing system 118 may decline the authorization request associated with the transaction based on the categorization or value of the fraud evaluation satisfying a predetermined threshold categorization or value (e.g., a fraud threshold set to minimize false positives).

Figure 3:
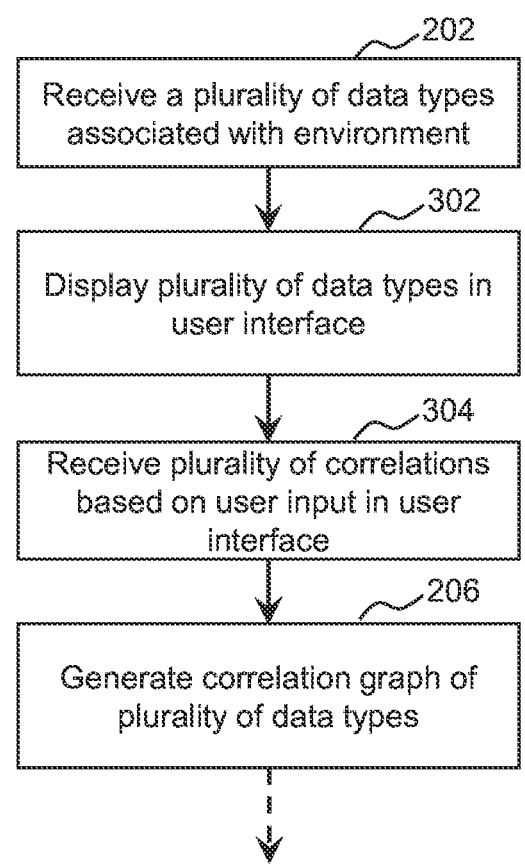
FIG. 3 is a flowchart illustrating a non-limiting embodiment or aspect of a method for generating synthetic data according to the principles of the present disclosure.

Referring now to FIG. 3, illustrated is a method 300 for generating synthetic data. The method 300 may be executed by one or more computing devices of a POS device 114, a merchant system 116, a transaction processing system 118, a fraud detection system 120, a data generation system 106, a user interface 108, a communication network 110, and/or the like. One or more steps of the method 300 may be performed by a same or different computing device than a preceding or following step of the method 300.

In step 202, a plurality of data types may be received. For example, a data generation system 106 may receive a plurality of data types associated with an environment to be evaluated.

In step 302, the plurality of data types may be displayed. For example, a data generation system 106 may display or cause the display of the plurality of data types in a user interface 108. In some non-limiting embodiments or aspects, the user interface 108 may be implemented on a computing device of a user that is trained to analyze and identify correlations in data types.

In step 304, the plurality of correlations may be received. For example, a data generation system 106 may receive the plurality of correlations based on user input in the user interface 108 that identifies associations within the plurality of data types. In some non-limiting embodiments or aspects, the user input may include a selection by a user in the user interface 108 of at least one set of two or more data types that are correlated. The plurality of correlations may be determined and/or generated from the user input.

In step 206, a correlation graph may be generated. For example, the data generation system 106 may generate a correlation graph based on the plurality of correlations determined and/or generated from the user input. Subsequent steps 208-222, depicted in FIG. 2, may follow step 206 of method 300.

Figure 4:
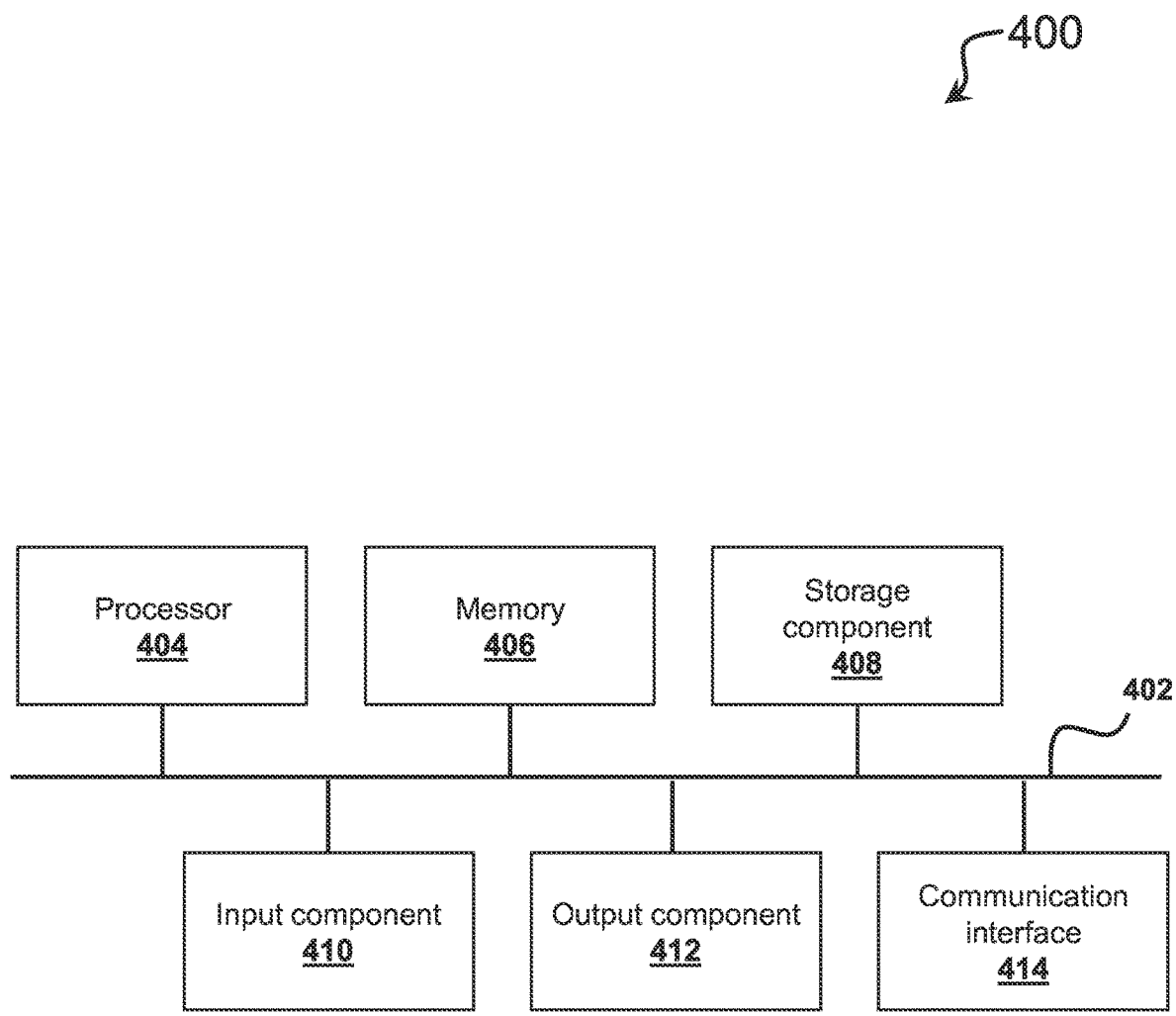
FIG. 4 is a diagram of a non-limiting embodiment or aspect of components of one or more devices of FIG. 1.

Referring now to FIG. 4, illustrated is a diagram of example components of device 400. Device 400 may correspond to one or more devices of payment device 112, one or more devices of POS device 114, one or more devices of merchant system 116, one or more devices of transaction processing system 118, one or more devices of fraud detection system 120, one or more devices of data generation system 106, one or more devices of user interface 108, and/or one or more devices of communication network 110. In some non-limiting embodiments or aspects, one or more devices of the foregoing may include at least one device 400 and/or at least one component of device 400. As shown in FIG. 4, device 400 may include bus 402, processor 404, memory 406, storage component 408, input component 410, output component 412, and communication interface 414.

Bus 402 may include a component that permits communication among the components of device 400. In some non-limiting embodiments or aspects, processor 404 may be implemented in hardware, software, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read-only memory (ROM), and/or another type of dynamic or static storage device (e.g., flash memory, magnetic memory, optical memory, etc.) that stores information and/or instructions for use by processor 404.

Storage component 408 may store information and/or software related to the operation and use of device 400. For example, storage component 408 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 410 may include a component that permits device 400 to receive information, such as via user input (e.g., a touchscreen display, a keyboard, a keypad, a mouse, a button, a switch, a microphone, a camera, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.).

Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a WiFi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 406 and/or storage component 408 may include data storage or one or more data structures (e.g., a database, and/or the like). Device 400 may be capable of receiving information from, storing information in, communicating information to, or searching information stored in the data storage or one or more data structures in memory 406 and/or storage component 408. For example, the information may include encryption data, input data, output data, transaction data, account data, or any combination thereof.

The number and arrangement of components shown in FIG. 4 are provided as an example. In some non-limiting embodiments or aspects, device 400 may include additional components, fewer components, different components, or differently arranged components than those shown in FIG. 4. Additionally or alternatively, a set of components (e.g., one or more components) of device 400 may perform one or more functions described as being performed by another set of components of device 400.

Figure 5:
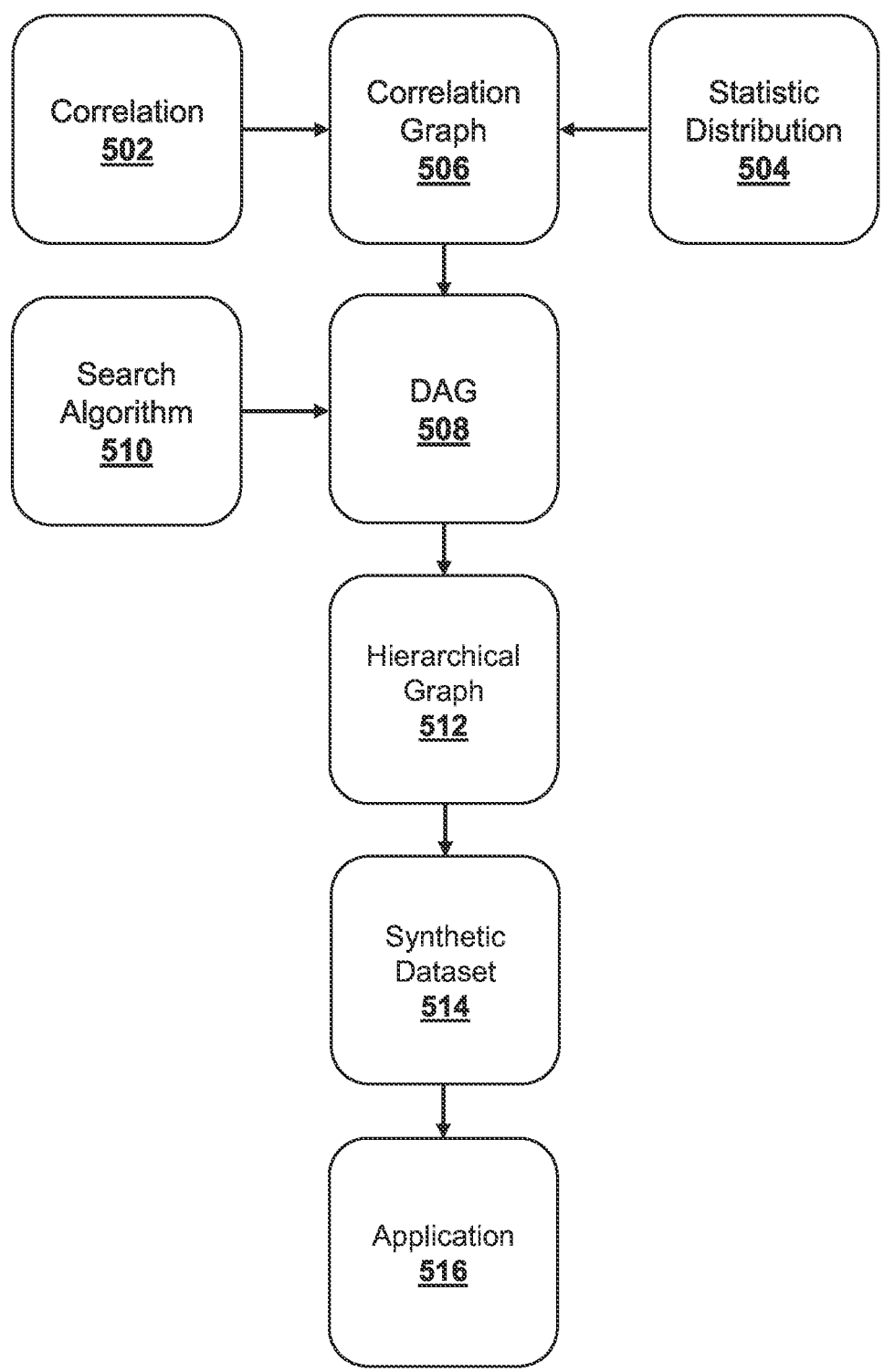
FIG. 5 is a flowchart illustrating a non-limiting embodiment or aspect of a method for generating synthetic data according to the principles of the present disclosure.

Referring now to FIG. 5, depicted is a flow diagram of a method for generating synthetic data according to principles of the present disclosure. The depicted method includes a series of steps that may be executed by one or more computing devices of a POS device 114, a merchant system 116, a transaction processing system 118, a fraud detection system 120, a data generation system 106, a user interface 108, a communication network 110, and/or the like. One or more steps of the depicted method may be performed by a same or different computing device than a preceding or following step of the depicted method.

Step 502 includes a correlation process. For example, an environment to be evaluated may be identified and a set of data types defined for the environment. A plurality of correlations may be generated by analyzing a sample dataset using a data generation system 106. Additionally or alternatively, a plurality of correlations may be generated based on input from a user having expert knowledge of the environment.

Step 504 includes a statistic distribution process. For example, statistic distributions of an existing sample dataset may be analyzed by a data generation system 106 to determine correlations between data types defined for the environment to be evaluated.

Step 506 includes a process of generating a correlation graph. For example, based on the correlation process in step 502 and/or the statistic distribution process in step 504, a data generation system 106 may generate a correlation graph representing correlations within a plurality of data types.

Step 508 includes a process of generating a directed acyclic graph (DAG). For example, a data generation system 106 may generate a DAG based on the correlation graph of step 506.

Step 510 includes a search algorithm process. For example, a data generation system 106 may apply a search algorithm (e.g., a path traversal technique such as random walk, breadth first, etc.) to the DAG to determine a dependent order of values to be generated from the data types in the DAG.

Step 512 includes a hierarchical graph process. For example, based on step 510, a data generation system 106 may generate a hierarchical graph of the plurality of data types based on the search algorithm applied to the DAG.

Step 514 includes a synthetic dataset generation process. For example, a data generation system 106 may generate a synthetic dataset by repeatedly traversing the hierarchical graph generated in step 512 to generate records of the synthetic dataset.

Figure 6:
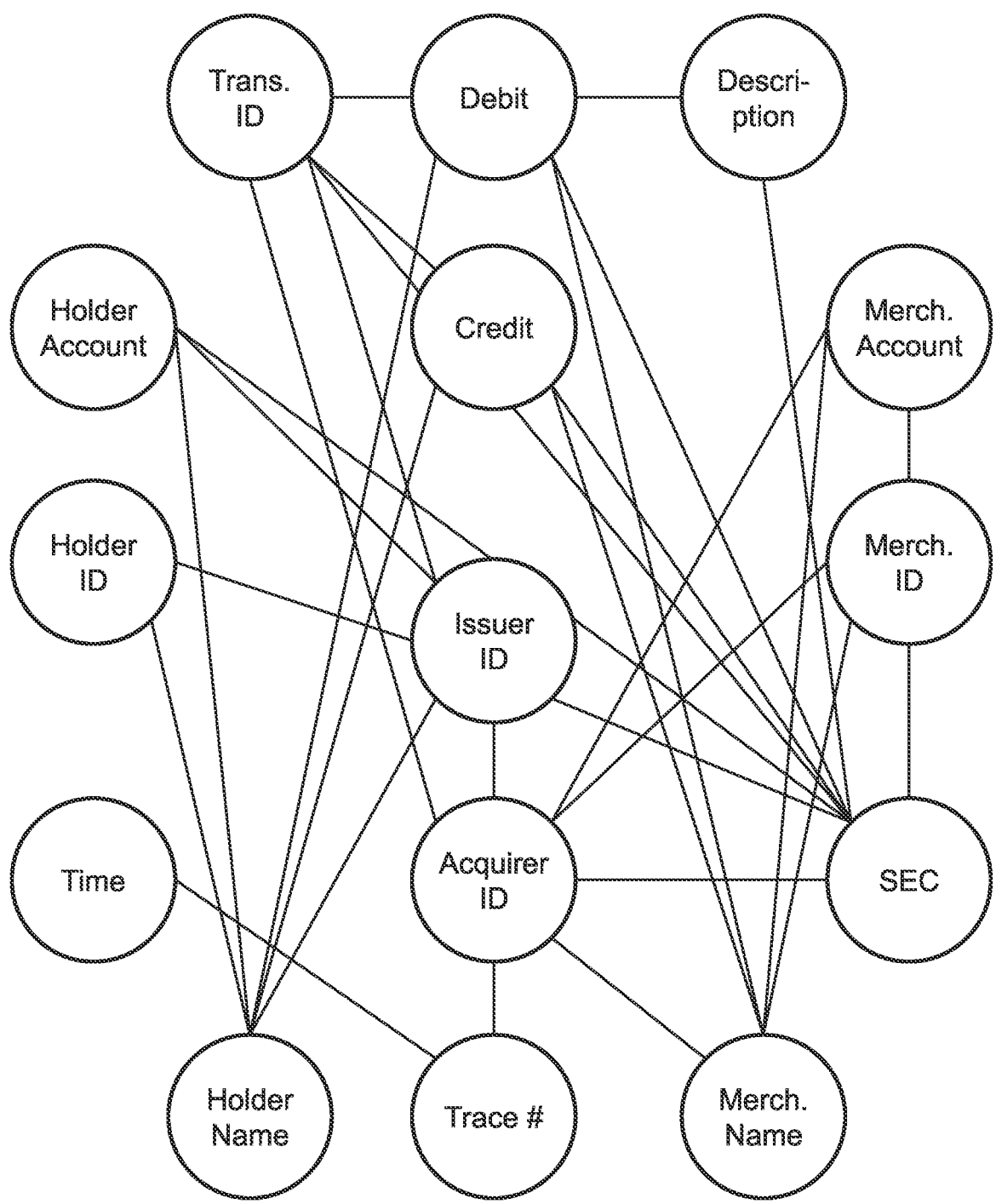
FIG. 6 is a correlation graph of a non-limiting embodiment or aspect of a method for generating synthetic data according to the principles of the present disclosure.

Referring now to FIG. 6, depicted is a correlation graph according to some non-limiting embodiments or aspects of a method for generating synthetic data. The depicted correlation graph may be generated for a payment transaction processing network as the environment to be evaluated. The plurality of data types shown are representative of transactions that may be processed by a transaction processing system 118 in the payment transaction processing system. The plurality of data types include, but are not limited to, transaction identifier, debit amount, credit amount, transaction description, payment device holder account identifier, payment device holder identifier, payment device holder name, merchant account identifier, merchant identifier, merchant name, issuer identifier, acquirer identifier, transaction time, transaction trace number, and SEC code. Each data type is associated with a node of the correlation graph. Each edge of the correlation graph represents a correlation between two nodes (e.g., correlation between two data types). It will be appreciated that the above techniques of generating a correlation graph may be applied for environments including other data types.

Figure 7:
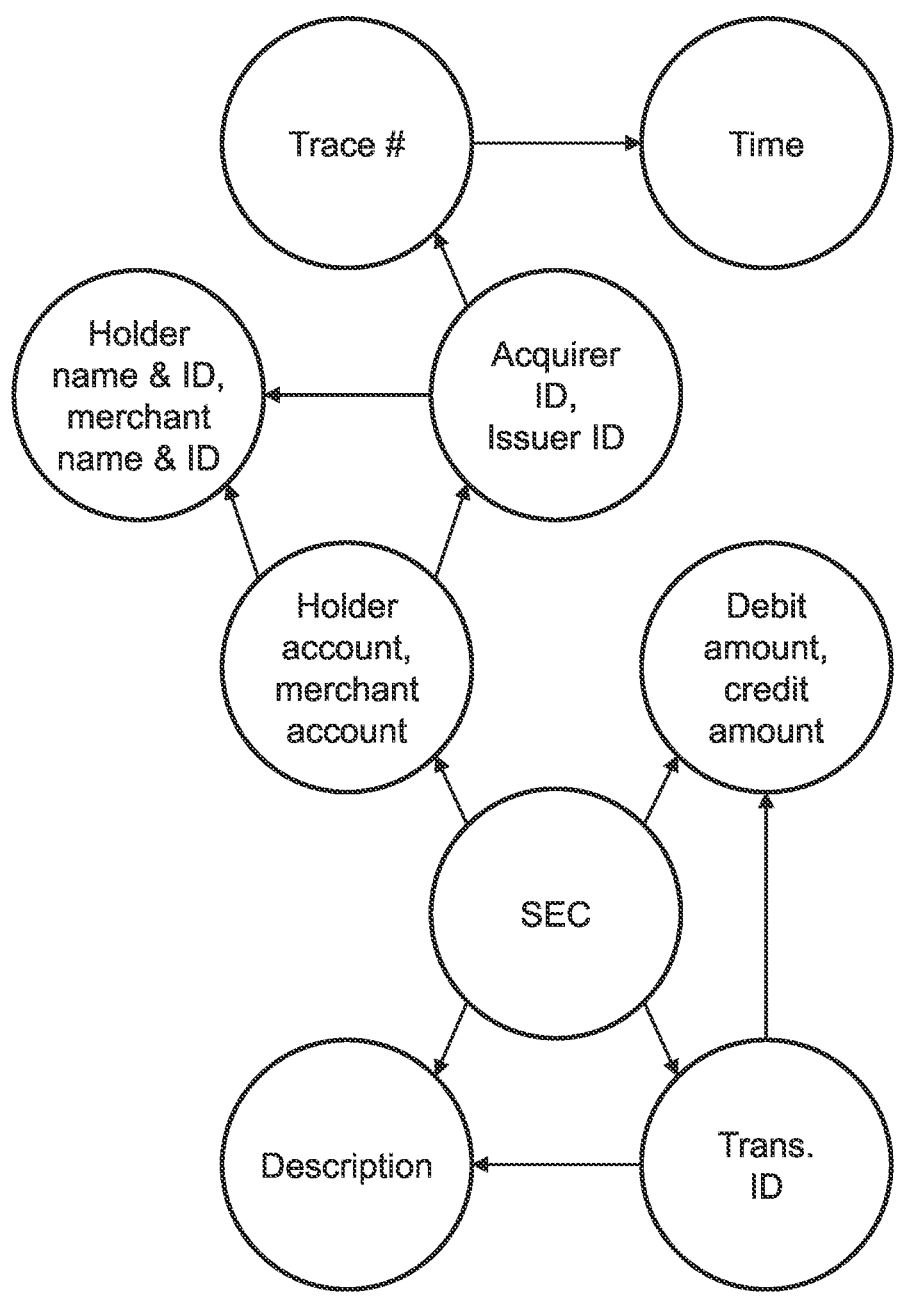
FIG. 7 is a directed acyclic graph of a non-limiting embodiment or aspect of a method for generating synthetic data according to the principles of the present disclosure.

Referring now to FIG. 7, depicted is a directed acyclic graph (DAG) according to some non-limiting embodiments or aspects of a method for generating synthetic data. The depicted DAG may be generated based on the correlation graph depicted in FIG. 6. Each node of the DAG represents one or more data types. Certain nodes of the correlation graph of FIG. 6 have been combined based on correlations of data types indicated in the correlation graph (e.g., strong correlations that may be indicative of requiring a same generation step). The following data types have been combined into respective same nodes in the DAG: (i) payment device holder name, payment device holder identifier, merchant name, merchant identifier; (ii) acquirer identifier, issuer identifier; (iii) payment device holder account identifier, merchant account identifier; and (iv) credit amount, debit amount. Each directed edge of the DAG represents a dependency (e.g., an order of generation) of node on a connected node. For example, a node representing one or more data types that is adjacent an arrow-end of a directed edge may be dependent on a node representing one or more data types that is adjacent a non-arrow-end of the directed edge. By way of further example, the transaction time node is dependent on the transaction trace number node. It will be appreciated that the above techniques of generating a DAG may be applied for environments include other data types.

Referring now to FIGS. 8-12, depicted are steps (e.g., first step through fifth step) of a path traversal technique (e.g., a breadth first search technique, including a longest path technique) as applied to the DAG of FIG. 7. For ease of reference, the data types of respective nodes have been assigned a node letter. For example, node A of FIGS. 8-12 corresponds to the node of FIG. 7 including the SEC code data type. Node B of FIGS. 8-12 corresponds to the node of FIG. 7 including the debit amount and credit amount data types. Node C of FIGS. 8-12 corresponds to the node of FIG. 7 including the transaction identifier data type. Node D of FIGS. 8-12 corresponds to the node of FIG. 7 including the transaction description data type. Node E of FIGS. 8-12 corresponds to the node of FIG. 7 including the payment device holder account identifier and merchant account identifier data types. Node F of FIGS. 8-12 corresponds to the node of FIG. 7 including the acquirer identifier and issuer identifier data types. Node G of FIGS. 8-12 corresponds to the node of FIG. 7 including the payment device holder name, payment device holder identifier, merchant name, and merchant identifier data types. Node H of FIGS. 8-12 corresponds to the node of FIG. 7 including the transaction trace number data type. Node I of FIGS. 8-12 corresponds to the node of FIG. 7 including the transaction time data type. The table depicted in each of FIGS. 8-12 shows nodes as rows and iterations (steps) as columns. As the first step of the path traversal technique includes identifying the index node, the first step is designated in the table as iteration 0.

Figure 8:
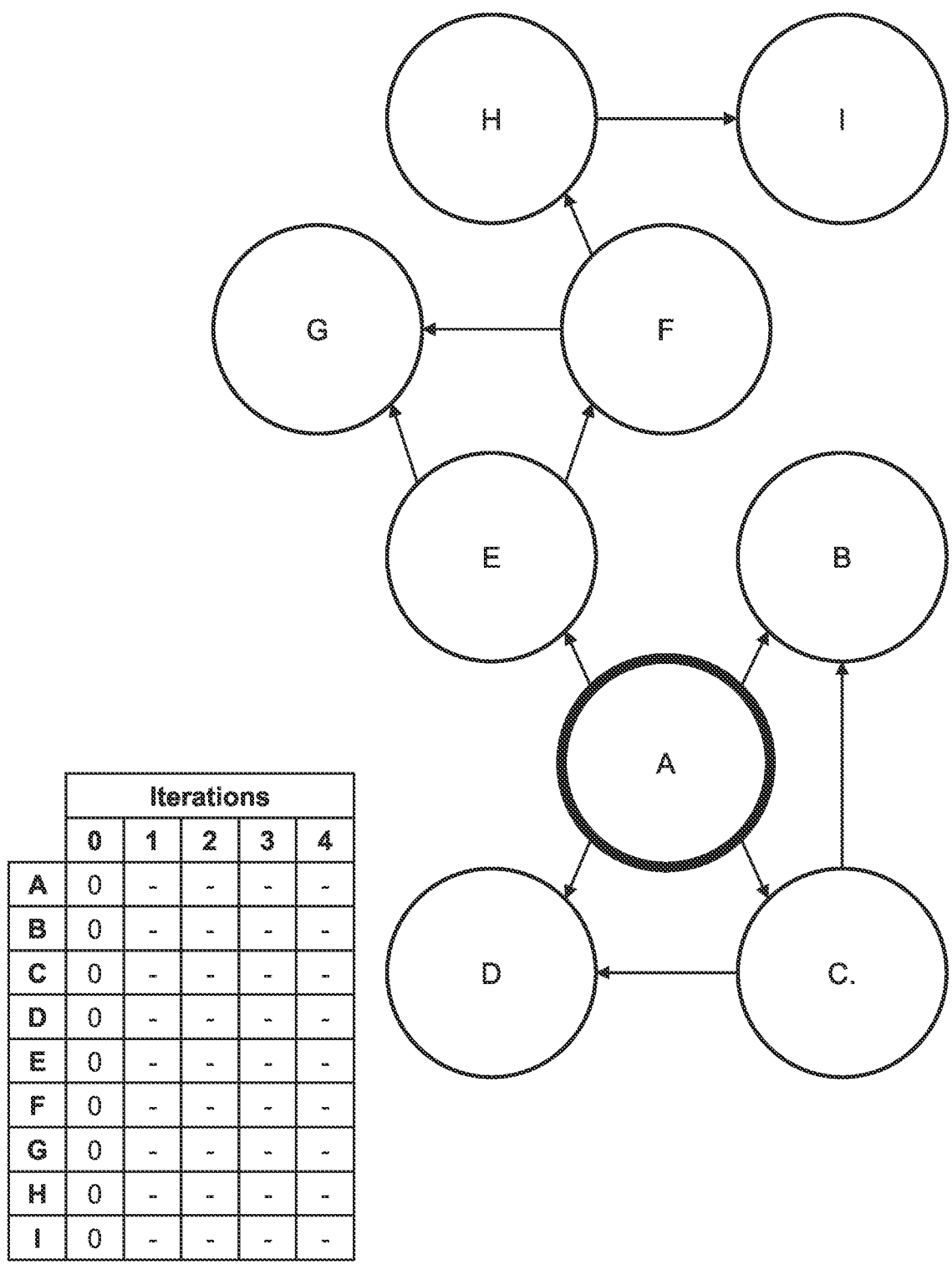
FIG. 8 is a first step of traversing a path in a directed acyclic graph of a non-limiting embodiment or aspect of a method for generating synthetic data according to the principles of the present disclosure.

Referring specifically to FIG. 8, depicted is a first step of a path traversal technique for traversing the DAG of FIG. 7. The path traversal technique depicted is a breadth first search (e.g., longest path), but other path traversal techniques may be applied. Node A may be identified as the start of the path traversal, as node A does not depend on any other nodes. For that reason, node A may be given a path length of 0, as node A is the index node. The table shows that at iteration 0 (first step), the current longest path to each node of the DAG is zero, since no further than node A has been traversed.

Figure 9:
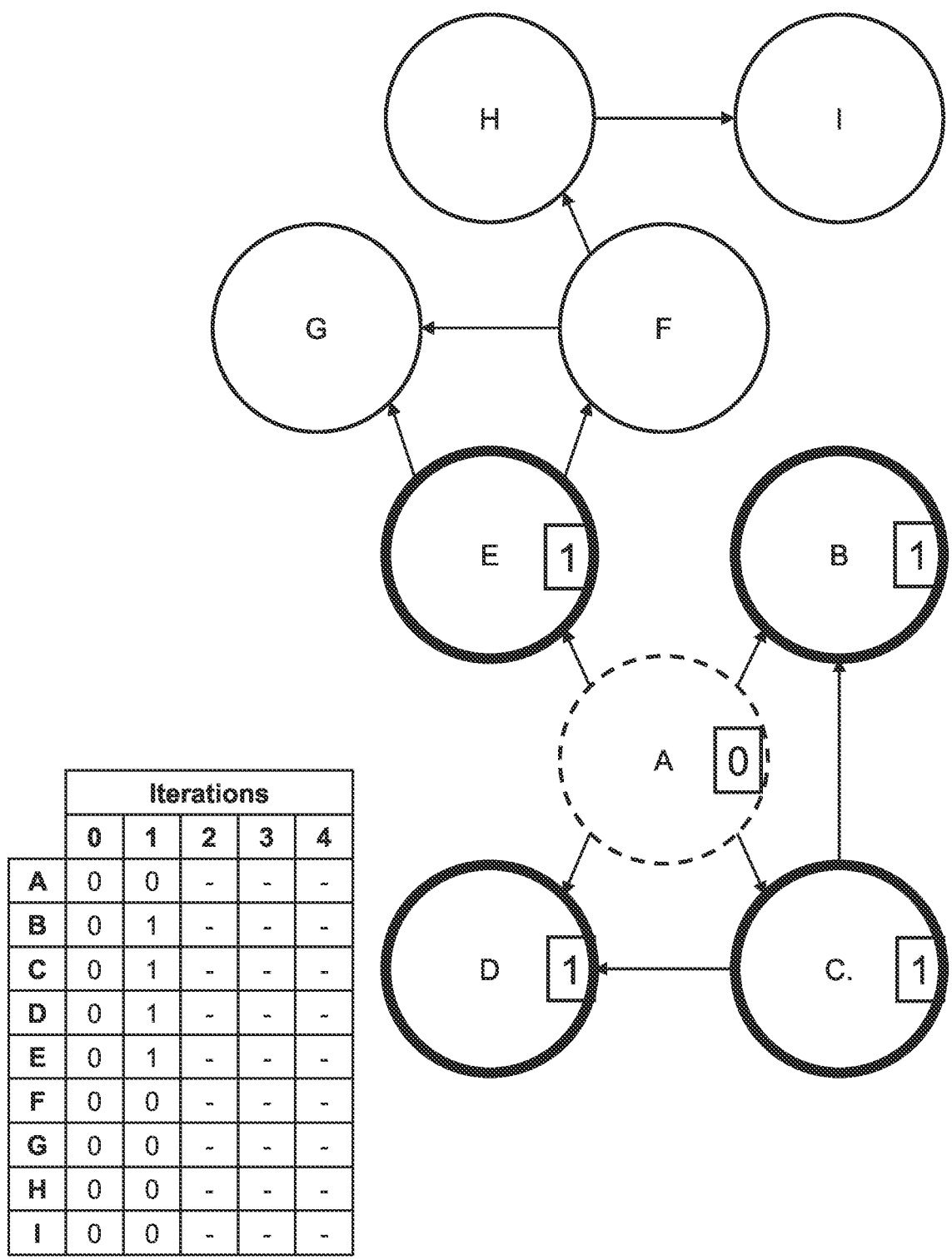
FIG. 9 is a second step of traversing a path in a directed acyclic graph of a non-limiting embodiment or aspect of a method for generating synthetic data according to the principles of the present disclosure.

Referring specifically to FIG. 9, depicted is a second step of a path traversal technique for traversing the DAG of FIG. 7. From node A, directed edges lead to nodes B, C, D, and E. Therefore, nodes B, C, D, and E may be given a path length of 1 (e.g., path length of node A plus 1). The depicted table has been updated to reflect that nodes B, C, D, and E now have a longest path length of 1 in iteration 1 (second step). Node A remains at length 0, given that it is the index node. The remaining nodes have not yet been reached and remain with length 0 in the second step.

Figure 10:
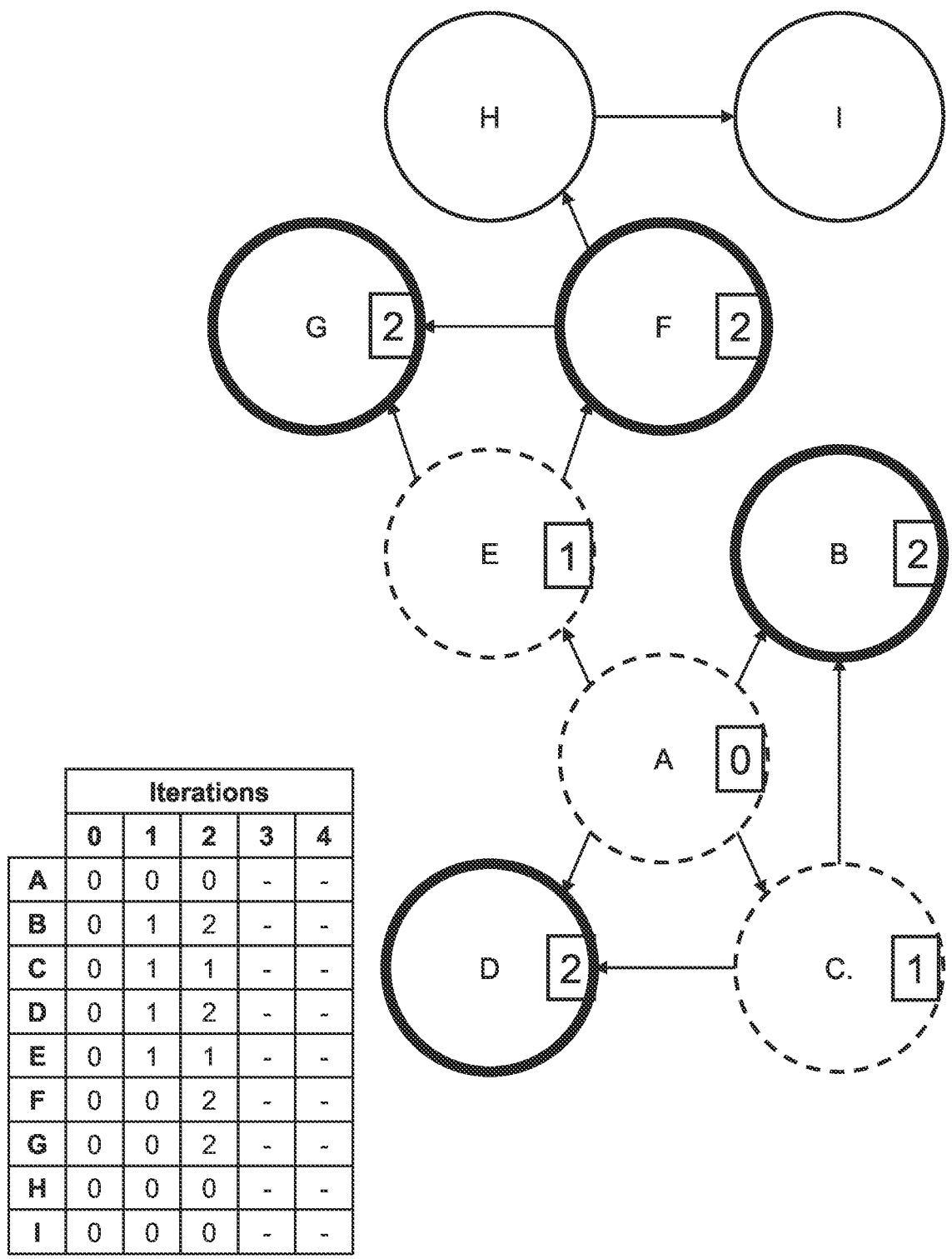
FIG. 10 is a third step of traversing a path in a directed acyclic graph of a non-limiting embodiment or aspect of a method for generating synthetic data according to the principles of the present disclosure.

Referring specifically to FIG. 10, depicted is a third step of a path traversal technique for traversing the DAG of FIG. 7. From node C, directed edges lead to nodes B and D. Therefore, nodes B and D may be given path lengths of 2 (e.g., path length of node C plus 1). From node E, directed edges lead to nodes F and G. Therefore, nodes F and G may be given path lengths of 2 (e.g., path length of node E plus 1). The depicted table has been updated to reflect that nodes B and D now have a longest path of 2 in iteration 2 (third step). Nodes F and G, having been reached, have also been updated to show path lengths of 2 in iteration 2. Node A remains at length 0, given that it is the index node. The remaining nodes have not yet been reached and remain with length 0 in the third step.

Figure 11:
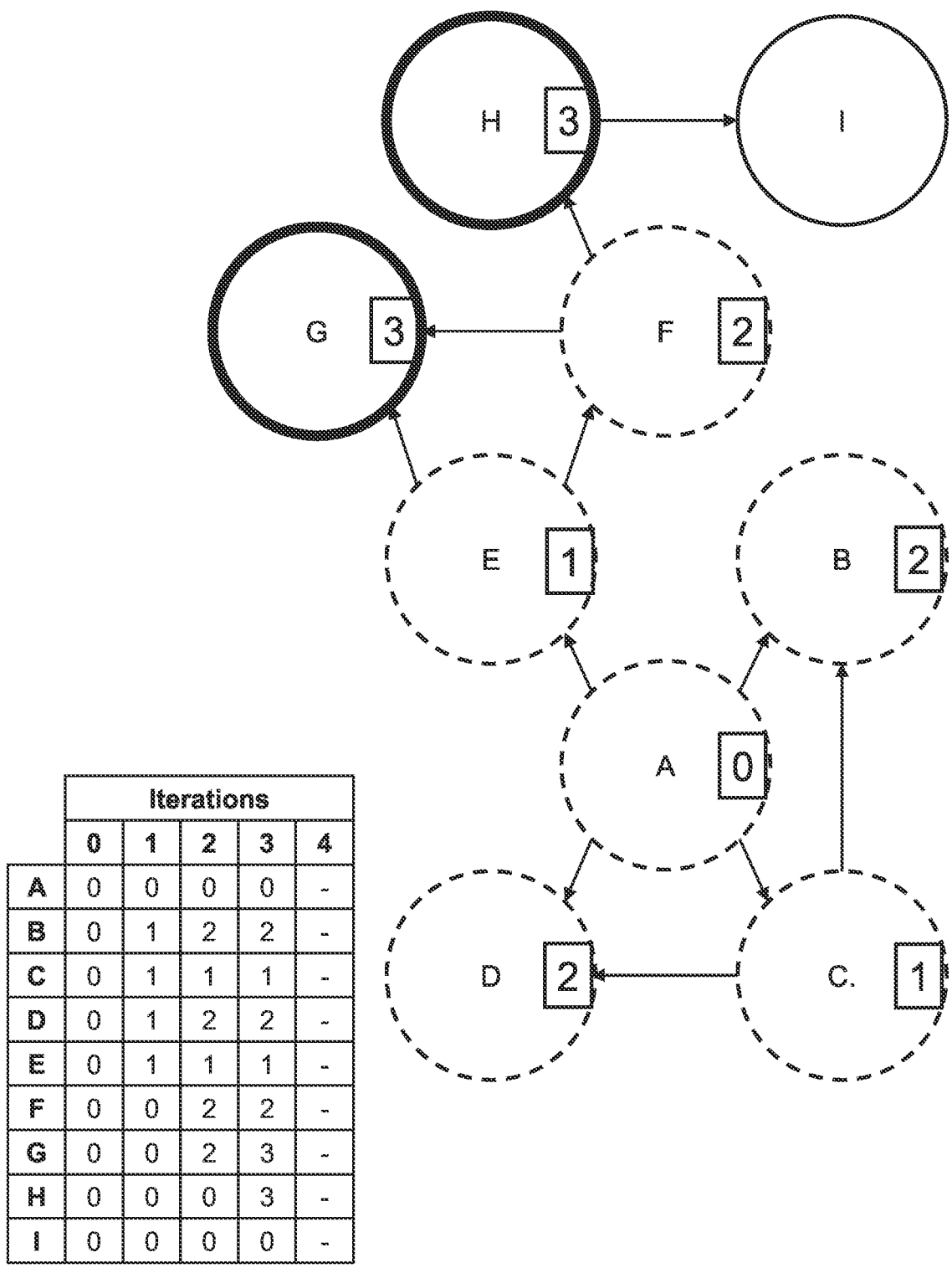
FIG. 11 is a fourth step of traversing a path in a directed acyclic graph of a non-limiting embodiment or aspect of a method for generating synthetic data according to the principles of the present disclosure.

Referring specifically to FIG. 11, depicted is a fourth step of a path traversal technique for traversing the DAG of FIG. 7. From node F, directed edges lead to nodes G and H. Therefore, nodes G and H may be given path lengths of 3. The depicted table has been updated to reflect the longest path lengths of nodes G and H in iteration 3 (fourth step). Node A remains at length 0, given that it is the index node. Node I has not yet been reached and remains with length 0 in the fourth step.

Figure 12:
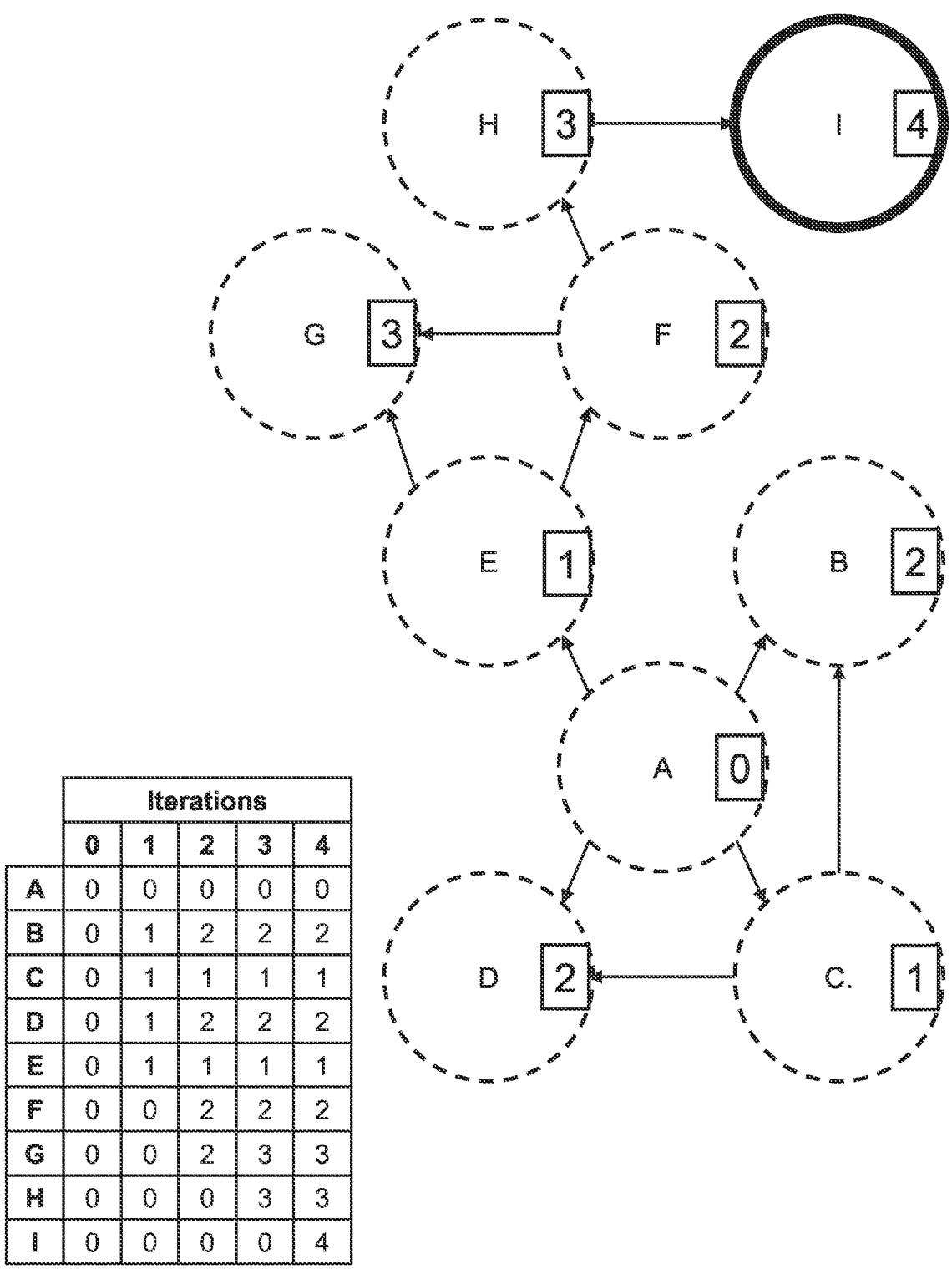
FIG. 12 is a fifth step of traversing a path in a directed acyclic graph of a non-limiting embodiment or aspect of a method for generating synthetic data according to the principles of the present disclosure.

Referring specifically to FIG. 12, depicted is a fifth step of a path traversal technique for traversing the DAG of FIG. 7. From node H, a directed edge leads to node I. Therefore, node I may be given a path length of 4 (e.g., the longest path length to node H plus 1). The depicted table has been updated to reflect the longest path length of node I in iteration 4 (fifth step). Node A remains at length 0, given that it is the index node. All nodes besides A have been reached along a path of directed edges, and no nodes remain unreached. Therefore, the longest paths of all nodes has been calculated by iteration 4. It will be appreciated that the above techniques may be applied to other DAGs. It will also be appreciated that the visual representation of the DAGs herein may be stored and operated on as ordered values (e.g., in a data object).

Figure 13:
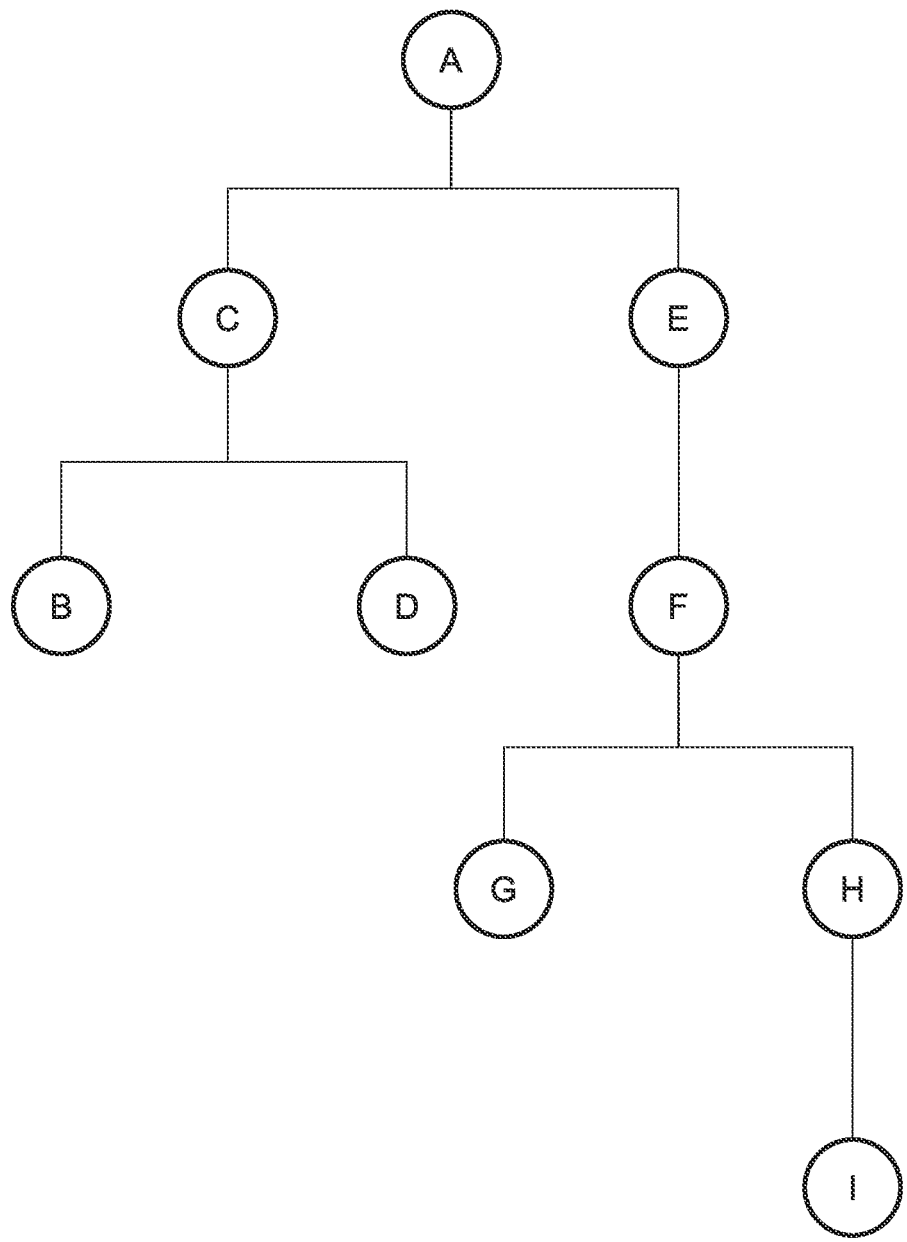
FIG. 13 is a hierarchical graph of a non-limiting embodiment or aspect of a method for generating synthetic data according to the principles of the present disclosure.

Referring specifically to FIG. 13, depicted is a hierarchical graph generated from the DAG of FIG. 7 using the path traversal technique depicted in FIGS. 8-12. Each tier of the hierarchical graph represents a subsequent path length. For example, node A, being the index node, may be represented as the root of the hierarchical graph in the top tier, having a longest path length of 0. Nodes C and E, traversable from node A, have a longest path length of 1 and may be depicted in the next lowest tier of the hierarchical graph. While nodes B and D also depend from node A, nodes B and D have higher longest path lengths. Nodes B and D depend from node C and have a longest path length of 2, and so may be depicted in the next lowest tier of the hierarchical graph. Node F also has a longest path length of 2 and depends from node E, therefore, node F may be depicted in the same tier as nodes B and D. Nodes G and H have a longest path length of 3 and depend from node F, therefore nodes G and H may be depicted in the next lowest tier. Finally, node I depends from node H and has a longest path length of 4, therefore, node I may be depicted in the next lowest tier.

Values of the data types represented by the nodes of the hierarchical graph may then be generated by traversing the hierarchical graph starting with the index node A and proceeding in any order that maintains the ordered dependency (e.g., generating the data types of the nodes in the following order: A, C, B, D, E, F, G, H, I; also, A, E, F, G, H, I, C, B, D; etc.). For example, a range of values for the data type of node A may be generated based on probabilities of said values for the data type of node A, which may be determined by statistical analysis of the environment, user input, and/or the like. Valid values for data types may be numerical, categorical, and/or the like. Numerical values may be determined by probabilistic distribution. Correlations between valid values of the data type of node C and valid values of the data type of node A may then be determined (e.g., by statistical analysis, user input, etc.). Therefore, the range of valid values for the data type of node C may be determined as conditional probabilities of the valid values of the data type of node A. Each successive dependent node may be traversed, wherein the values of successive data types therein are determined based on conditional probabilities from nodes from which the successive dependent node depends. It will be appreciated that the above techniques may be applied to other hierarchical graphs. It will be also appreciated that the visual representation of the hierarchical graph may be stored and operated on as ordered values (e.g., in a data object).

Figure 14:
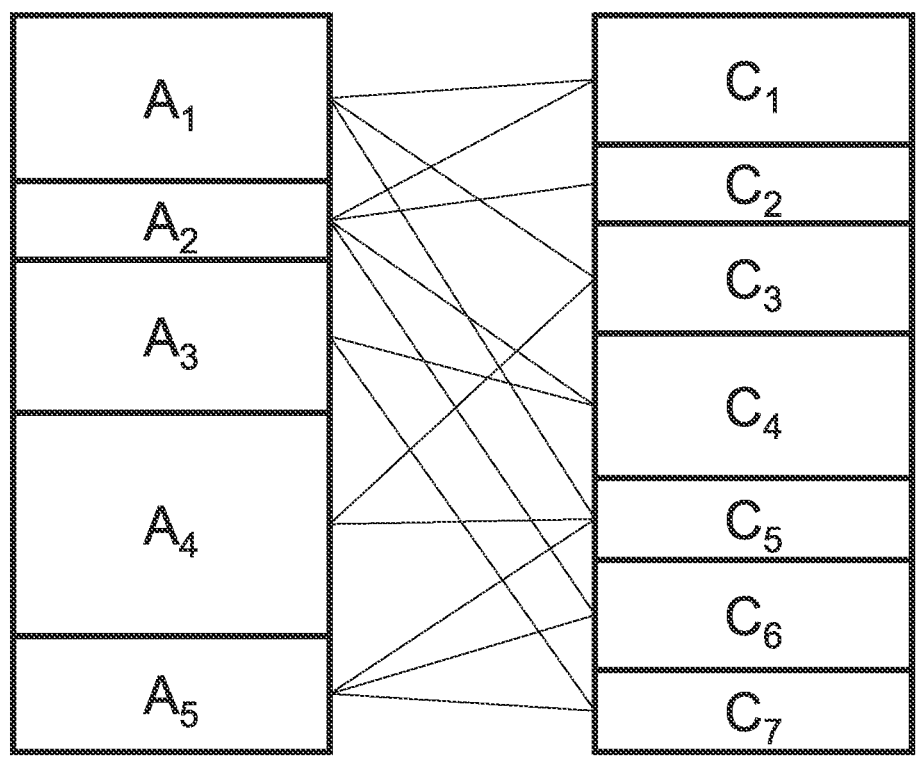
FIG. 14 is a schematic diagram associated with assigning values to data types of a non-limiting embodiment or aspect of a method for generating synthetic data according to the principles of the present disclosure.

Referring to FIG. 14, depicted is a schematic diagram associated with assigning values to data types using a hierarchical graph of FIG. 13, according to some non-limiting embodiments or aspects. Each data type of the hierarchical graph may be assigned a set or range of valid values. As shown, a data type associated with node A may be provided with a set of five values $A_1$ to $A_5$ (e.g., five categories). It will be appreciated that valid values may be numerical, categorical, and/or the like. A data type associated with node C may be provided with a set of seven values $C_1$ to $C_7$ (e.g., seven categories). The probability of each value of a first data type (e.g., of node A) may be initially calculated. For example, the probability of each value of the valid values $A_1$ to $A_5$ may be generated based on statistical analysis of existing datasets. The probability of the valid values $A_1$ to $A_5$ may also be input by a user having expert knowledge of the environment to be evaluated. Based on the individual probabilities of the values of a first data type (e.g., of node A), interdependencies (e.g., correlations, relationships) may be identified (e.g., by a data generation system 106, by a user, etc.) between the values of one data type and the values of another data type. Interdependencies between the values of each data type are depicted by lines between the values (e.g., $A_1$ to $C_1$, $C_3$, and $C_5$). Comparative probabilities (e.g., likelihoods) of the values of each data type are exemplified by the relative size of the field afforded to each value.

With further reference to FIGS. 13 and 14, once a hierarchical graph is generated, values can be populated for each node in the graph. Since the nodes in the hierarchical graph represent attributes/variables in the dataset, a synthetic record can be generated that is populated with values after traversing the hierarchical graph from the node at the top to the nodes at the very bottom. Interdependency among the nodes in the hierarchical graph can be maintained in the generation of the synthetic data. For example, consider the traversal from node A to node C in FIG. 13 that is illustrated statistically in FIG. 14. In such an example, consider the case where node A and node C are categorical variables. It will be appreciated that the same algorithms can be used for numerical variables. In the depicted non-limiting embodiments or aspects, there are 5 categories of the variable of node A and 7 categories of the variable of node C. Lines between two boxes represents an interdependency. For example, the depicted lines indicate if the value for A is $A_1$, then the value for C can only be $C_1$, $C_3$, and $C_5$. Each link/edge between the boxes may also be assigned a weight to indicate probability. In such an example, when node A is $A_1$, there is a 50% probability for node C to be $C_1$, a 30% probability for node C to be $C_3$, and a 20% probability for node C to be $C_5$. Using this method, a figure as depicted in FIG. 14 may be generated for traversing all the nodes in the hierarchical graph. Combining the hierarchical graph and the method of FIG. 14, realistic synthetic data may be generated that accounts for interdependency among different variables Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for generating synthetic training data comprising:

receiving, with at least one processor, a plurality of data types associated with an environment to be evaluated;

receiving, with at least one processor, a plurality of correlations, each correlation of the plurality of correlations comprising a dependency of one data type of the plurality of data types on another data type of the plurality of data types;

generating, with at least one processor, a correlation graph of the plurality of data types based on the plurality of correlations;

generating, with at least one processor, a directed acyclic graph of the plurality of data types based on the correlation graph;

repeatedly traversing, with at least one processor, the directed acyclic graph to generate a hierarchical graph of the plurality of data types, the hierarchical graph comprising a plurality of nodes arranged in a plurality of tiers defined by a path length of nodes resulting from the traversals, wherein each node of the plurality of nodes is associated with a data type of the plurality of data types, wherein each node of the hierarchical graph is connected to a subsequent node according to an ordered dependency;

generating, with at least one processor, synthetic training data comprising a plurality of records of data by repeatedly traversing the hierarchical graph in accordance with the ordered dependency, wherein each record is based on a set of values determined at each node of the hierarchical graph, a set of probabilities associated with the set of values, and a set of interdependencies, wherein each set of values is associated with a data type of the plurality of data types, wherein each set of interdependencies is associated with a connected pair of nodes in the hierarchical graph, wherein each set of probabilities is associated with a set of interdependencies between the individual probabilities of one value of one data type and the probabilities of a subsequent connected data type;

training, with at least one processor, at least one machine learning model of a fraud detection system using the synthetic training data;

receiving, with at least one processor, an authorization request associated with a transaction between a merchant system and a payment device; and during payment processing of the transaction:
  generating, with at least one processor, a fraud evaluation of the transaction based on inputting at least a portion of the authorization request to the at least one machine learning model; and
  declining, with at least one processor, the authorization request based on the fraud evaluation.

2. The computer-implemented method of claim 1, wherein the environment to be evaluated is a payment transaction processing network comprising a transaction processing system programmed and/or configured to process a plurality of transactions.

3. The computer-implemented method of claim 2, wherein the plurality of data types comprise at least two of the following: transaction time, payment device holder account identifier, transaction description, issuer identifier, acquirer identifier, transaction identifier, merchant account identifier, or any combination thereof.

4. The computer-implemented method of claim 1, further comprising:
  displaying or causing the display of, with at least one processor, the plurality of data types in a user interface; and
  receiving, with at least one processor, the plurality of correlations based on user input in the user interface identifying associations within the plurality of data types.

5. The computer-implemented method of claim 1, wherein traversing the directed acyclic graph comprises:
  traversing the directed acyclic graph using a random walk technique or a breadth first search technique.

6. A system for generating synthetic training data, the system comprising at least one processor, the at least one processor programmed and/or configured to:
  receive a plurality of data types associated with an environment to be evaluated;
  receive a plurality of correlations, each correlation of the plurality of correlations comprising a dependency of one data type of the plurality of data types on another data type of the plurality of data types;
  generate a correlation graph of the plurality of data types based on the plurality of correlations;
  generate a directed acyclic graph of the plurality of data types based on the correlation graph;
  repeatedly traverse the directed acyclic graph to generate a hierarchical graph of the plurality of data types, the hierarchical graph comprising a plurality of nodes arranged in a plurality of tiers defined by a path length of nodes resulting from the traversals, wherein each node of the plurality of nodes is associated with a data type of the plurality of data types, wherein each node of the hierarchical graph is connected to a subsequent node according to an ordered dependency;
  generate synthetic training data comprising a plurality of records of data by repeatedly traversing the hierarchical graph in accordance with the ordered dependency, wherein each record is based on a set of values determined at each node of the hierarchical graph, a set of probabilities associated with the set of values, and a set of interdependencies, wherein each set of values is associated with a data type of the plurality of data types, wherein each set of interdependencies is associated with a connected pair of nodes in the hierarchical graph, wherein each set of probabilities is associated with a set of interdependencies between the individual probabilities of one value of one data type and the probabilities of a subsequent connected data type;
  train at least one machine learning model of a fraud detection system using the synthetic training data;
  receive an authorization request associated with a transaction between a merchant system and a payment device; and
  during payment processing of the transaction:
    generate a fraud evaluation of the transaction based on inputting at least a portion of the authorization request to the at least one machine learning model; and
    decline the authorization request based on the fraud evaluation.

7. The system of claim 6, wherein the environment to be evaluated is a payment transaction processing network comprising a transaction processing system programmed and/or configured to process a plurality of transactions.

8. The system of claim 7, wherein the plurality of data types comprise at least two of the following: transaction time, payment device holder account identifier, transaction description, issuer identifier, acquirer identifier, transaction identifier, merchant account identifier, or any combination thereof.

9. The system of claim 6, wherein the at least one processor is further programmed and/or configured to:
- display or cause the display of the plurality of data types in a user interface; and
- receive the plurality of correlations based on user input in the user interface identifying associations within the plurality of data types.

10. The system of claim 6, wherein, while traversing the directed acyclic graph, the at least one processor is programmed or configured to:
- traverse the directed acyclic graph using a random walk technique or a breadth first search technique.

11. A computer program product for generating synthetic training data, the computer program product comprising at least one non-transitory computer-readable medium storing one or more instructions that, when executed by at least one processor, cause the at least one processor to:
- receive a plurality of data types associated with an environment to be evaluated;
- receive a plurality of correlations, each correlation of the plurality of correlations comprising a dependency of one data type of the plurality of data types on another data type of the plurality of data types;
- generate a correlation graph of the plurality of data types based on the plurality of correlations;
- generate a directed acyclic graph of the plurality of data types based on the correlation graph;
- repeatedly traverse the directed acyclic graph to generate a hierarchical graph of the plurality of data types, the hierarchical graph comprising a plurality of nodes arranged in a plurality of tiers defined by a path length of nodes resulting from the traversals, wherein each node of the plurality of nodes is associated with a data type of the plurality of data types, wherein each node of the hierarchical graph is connected to a subsequent node according to an ordered dependency;
- generate synthetic training data comprising a plurality of records of data by repeatedly traversing the hierarchical graph in accordance with the ordered dependency, wherein each record is based on a set of values determined at each node of the hierarchical graph, a set of probabilities associated with the set of values, and a set of interdependencies, wherein each set of values is associated with a data type of the plurality of data types, wherein each set of interdependencies is associated with a connected pair of nodes in the hierarchical graph, wherein each set of probabilities is associated with a set of interdependencies between the individual probabilities of one value of one data type and the probabilities of a subsequent connected data type;
- train at least one machine learning model of a fraud detection system using the synthetic training data;
- receive an authorization request associated with a transaction between a merchant system and a payment device; and
- during payment processing of the transaction:
  - generate a fraud evaluation of the transaction based on inputting at least a portion of the authorization request to the at least one machine learning model; and
  - decline the authorization request based on the fraud evaluation.

12. The computer program product of claim 11, wherein the environment to be evaluated is a payment transaction processing network comprising a transaction processing system programmed and/or configured to process a plurality of transactions, and wherein the plurality of data types comprise at least two of the following: transaction time, payment device holder account identifier, transaction description, issuer identifier, acquirer identifier, transaction identifier, merchant account identifier, or any combination thereof.

13. The computer program product of claim 11, wherein the one or more instructions further cause the at least one processor to:
- display or cause the display of the plurality of data types in a user interface; and
- receive the plurality of correlations based on user input in the user interface identifying associations within the plurality of data types.

14. The computer program product of claim 11, wherein the one or more instructions that cause the at least one processor to traverse the directed acyclic graph cause the at least one processor to traverse the directed acyclic graph using a random walk technique or a breadth first search technique.

* * * * *